PRUNING MACHINE

Original Filed April 25, 1963 7 Sheets-Sheet 1

INVENTORS
JOSEPH M. PATTERSON
EDWARD B. WILSON, JR.

BY Hans G. Hoffmeister
ATTORNEY

PRUNING MACHINE

Original Filed April 25, 1963 7 Sheets-Sheet 2

INVENTORS
JOSEPH M. PATTERSON
EDWARD B. WILSON, JR.
BY Hans G. Hofmeister
ATTORNEY

PRUNING MACHINE

Original Filed April 25, 1963 7 Sheets-Sheet 3

INVENTORS
JOSEPH M. PATTERSON
EDWARD B. WILSON, JR.

BY Hans G. Hoffmeister
ATTORNEY

PRUNING MACHINE

Original Filed April 25, 1963 7 Sheets-Sheet 4

INVENTORS
JOSEPH M. PATTERSON
EDWARD B. WILSON, JR.
BY Hans G. Hoffmeister
ATTORNEY

PRUNING MACHINE

Original Filed April 25, 1963 7 Sheets-Sheet 5

INVENTORS
JOSEPH M. PATTERSON
EDWARD B. WILSON, JR.

BY Hans G. Hoffmeister
ATTORNEY

PRUNING MACHINE

Original Filed April 25, 1963 7 Sheets-Sheet 6

INVENTORS
JOSEPH M. PATTERSON
EDWARD B. WILSON, JR.
BY Hans G. Hoffmeister
ATTORNEY INVENTORS
JOSEPH M. PATTERSON
EDWARD B. WILSON, JR.
BY Hans G. Hoffmeister
ATTORNEY United States Patent Office Re. 26,793
Reissued Feb. 17, 1970

26,793
PRUNING MACHINE

Joseph M. Patterson, Winter Park, and Edward B. Wilson, Jr., Madison, Fla., assignors to FMC Corporation, San Jose, Calif., a corporation of Delaware Original No. 3,246,460, dated Apr. 19, 1966, Ser. No. 275,561, Apr. 25, 1963. Application for reissue Dec. 6, 1967, Ser. No. 694,769
Int. Cl. A01d *55/18*
U.S. Cl. 56—235 11 Claims

Matter enclosed in heavy brackets [ ] appears in the original patent but forms no part of this reissue specification; matter printed in italics indicates the additions made by reissue.

*ABSTRACT OF THE DISCLOSURE*

*The tree topping apparatus includes a mobile base and a telescoping mast projecting upwardly from the base. An elongated boom is pivotally connected to the upper portion of the mast for elevational movement therewith and for pivoting in a vertical plane relative to the upper mast portion. A plurality of saws are rotatably mounted on the boom for rotation in generally parallel plane, and actuating means are provided between the boom and the upper portion of the mast for pivoting the boom relative to the upper portion of the mast to vary the plane of the saws.*

This invention relates to a pruning machine and more particularly to a mobile apparatus adapted for pruning or trimming rows of trees and the like.

An object of this invention is to provide a new and improved pruning machine.

Another object of this invention is to provide a new and improved tree topping machine having novel cutting devices that are constructed and arranged to effect smooth clean topping of the tree.

Another object of this invention is to provide a new and improved tree topping machine wherein the brush resulting from the cutting operation is continually removed from the tree tops.

Still another object of this invention is to provide a new and improved tree topping machine in which formed panels enclose the supporting frame to avoid accumulation of cuttings on certain of the parts of the machine and thus insuring continuous trouble-free operation.

Another object of this invention is to provide a new and improved tree topping machine having a selectively angularly adjustable support for the cutting elements which can be oriented to top the trees at an angle.

Another object of this invention is to provide a new and improved tree topping machine having the cutting elements located in a plane disposed at an acute angle relative to the horizontal with the apex of such angle defining the leading edge of the cutting elements.

Other objects and advantages of the invention will become apparent from the following description and drawings, in which:

FIGURE 13 is an enlarged perspective of resilient brush removing fingers located on the inboard rotor.

FIGURE 14 is a section taken substantially along the line 14—14 of FIGURE 13.

Figure 1:
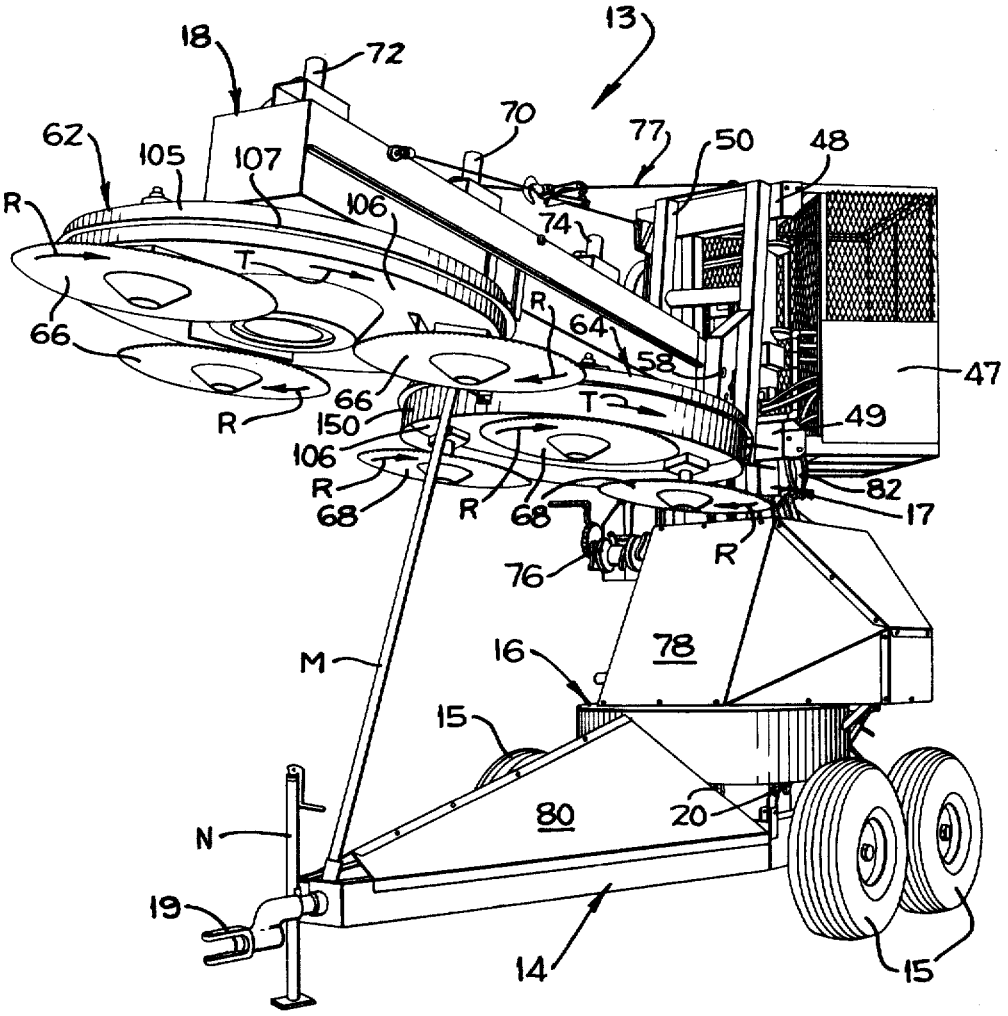
FIGURE 1 is a perspective of a tree topping machine constructed in accordance with the principles of this invention showing the machine conditioned for transport.
Figures 2, 3, 4:
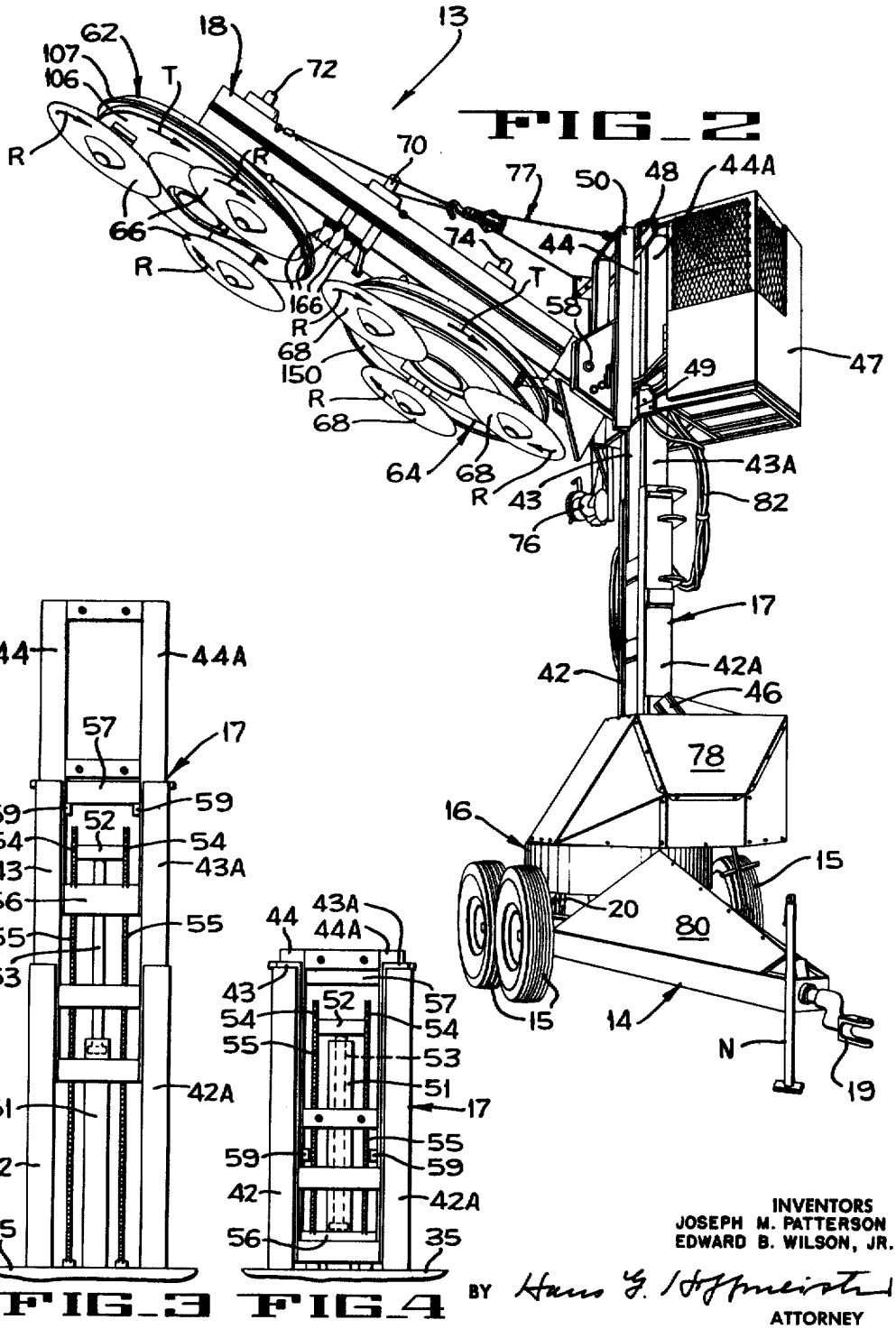
FIGURE 2 is another perspective showing the orientation of the various parts when the machine is oriented for operation.
FIGURES 3 and 4 are schematic elevations showing two operating positions of a mast-actuating mechanism that may be used with the machine of FIG. 1.

Referring to FIGURES 1 and 2, the tree topping machine of the present invention, generally indicated by the numeral 13, includes a base frame 14 having rotatably mounted thereon two pairs of ground engaging wheels 15, a turntable 16 mounted on the base, a mast 17 projecting upwardly from the turntable, and a saw-carrying boom 18 extending outwardly from the top end of the mast 17. A hitch 19, of conventional design, is secured to the forward portion of the base frame 14 and is connectable to a prime mover (not shown) by which the topping machine is towed along past a row of trees. The turntable 16 (FIG. 5) is supported on the base frame 14 by means of a plurality of caster wheel units 20 that are secured to transverse and longitudinal channels 21 and 22, respectively, of the base. The turntable 16 includes a top plate 23, a bottom plate 24, and a cylindrical outer plate 25 and a cylindrical inner plate 26, all welded together to form a rigid support structure and to define an annular chamber between the inner and outer plates 25 and 26. This chamber serves as a sump S for storing the liquid of a hydraulic control system which will be described presently.

An aperture is formed in the center of the bottom plate 24 of the turntable and a hub 28, that is bolted to the plate, is centered in the aperture and is rotatably journalled in suitable bearings on the upper end of a vertical shaft 30, said shaft being welded to two plates 31 and 32 that are bolted to fixed channel members of the base 14.

The turntable 16 therefore is supported on caster wheels 20 for rotation about the axis of shaft 30.

The annular sump provided by the turntable is equipped with a plurality of vertical stiffening plates (not shown) that are disposed radially of the shaft 30, each plate having perforations that permit circulation of the liquid throughout the sump.

A box-like mounting member 35 is welded to the upper surface of the top plate 23 of the turntable and, on the upper surface of the member 35, an engine 36 is mounted. The engine drives a tandem pump 38 by means of a belt and pulley drive 39. A fuel tank 40 is mounted on the upper surface of turntable 16 adjacent the end of the mounting member 35.

Figure 5:
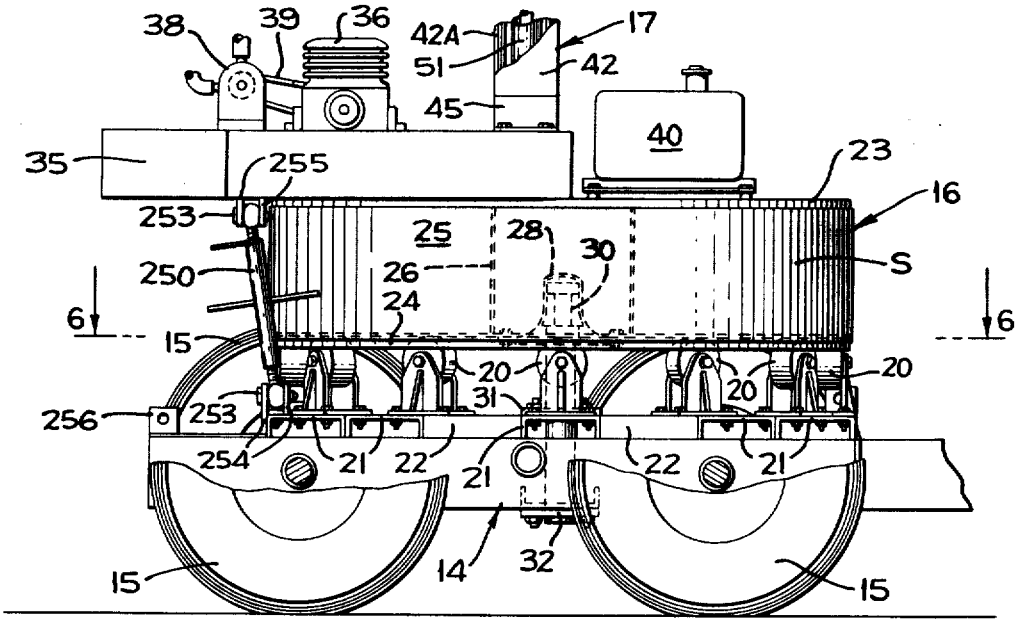
FIGURE 5 is a fragmentary, schematic elevation illustrating the turntable upon which the superstructure is supported.

The mast 17 (FIG. 2) comprises three pairs of channel members 42, 42A, 43, 43A, and 44, 44A that are mounted in telescoping relation. The upper channels 44, 44A slide within the intermediate channels 43, 43A, and the intermediate channels slide within the lower channels 42, 42A, each of which has an angle plate 45 (FIG. 5)

welded to its lower end for bolting to the top plate of the mounting member 35. Other bracing members such as the shallow channel 46 (FIG. 2) may be provided to support the mast in vertical position.

An operator's cab 47 is movable up and down with the upper section of the mast, being bolted to the ends of two transverse bars 48 and 49 that are welded to an intermediate, rectangular frame 50. The bars 48 and 49, span the upper end portions of the mast members 44, 44A, and are bolted thereto. The cab 47 is a rigid member and is so connected to the bars 48 and 49 that it is disposed at an angle relative to a vertical plane passing through the mast 17 and through the boom 18. As a result, the mast is not disposed between the boom, and the operator has an unobstructed view of the cutting operation from a position at a higher elevation than the plane of the saws.

The mast is raised by means of a hydraulic power cylinder 51 (FIG. 3) that is mounted in fixed position on the top of the mounting member 35 between the mast members 42, 42A. A cross beam 52 is secured to the upper end of the piston rod 53 of cylinder 51 and a sprocket 54 is rotatably mounted at each end of the beam. A chain 55 is trained around each sprocket and has one end anchored on the support member 35 and the other end anchored on a member 56 that extends across the lower ends of the upper mast members 44, 44A and is secured thereto. It will be evident that, when pressurized fluid is directed into the lower end of the power cylinder 51, the sprockets 54 will be raised and the upper mast members 44, 44A will be elevated. At a predetermined point in the upward movement of the upper mast members, an abutment plate 57, that is secured across the intermediate mast members 43, 43A is engaged by bars 59 secured across the mast members 44, 44A, causing the intermediate members to be raised. The mast is lowered to the nested position of FIG. 4 under control of a hydraulic system which will be described presently.

The boom 18 is an elongated, generally rectangular fabricated member that is pivotallly connected at 58 to the intermediate frame 50. Outboard and inboard saw carriers 62 and 64, respectively, are rotatably mounted in longitudinally spaced relation on the boom 18, and each saw carrier has in turn rotatably secured thereto, respectively, circumferentially spaced saws 66 and 68. A motor 70 (FIG. 7), of any desirable type, but herein preferably hydraulic, is secured to the upper surface of the boom 18 and has a drive shaft operably connected to each of the saw carriers 62 and 64 to cause rotation thereof in the direction indicated by the arrows T. Additional hydraulic motors 72 and 74 are mounted on the boom 18 and effect simultaneous rotation of the saws 66 and 68, respectively, in the direction indicated by the arrow R. A conventional winch 76 is mounted on the intermediate frame 50 at the upper end of the mast and includes a cable system 77 connected between the boom 18 and the reel of the winch to effect pivotal movement of the boom 18 about the pivot 58 in order to orient the saws of the machine for topping of the tops of trees at an angle relative to a horizontal plane.

As shown in FIGURES 1 and 2, a formed cover 78 having downwardly sloping sides encloses the engine 36, the pump 38, and related apparatus mounted on the turntable, with the sloping sides being effective to direct the brush resulting from the cutting action of the saws laterally away from the base of the machine and thus preclude interference with the normal operation of the apparatus. In addition to the cover 78, a cover 80 is secured to the forward converging portion of the base frame 14 and has sloping sides to also direct the brush laterally of the base of the machine. A plurality of nested hoses 82 connected to the two discharge conduits of the tandem pump 38 are connected to the hydraulic control valves located in the operator's cab 47. One of the hoses in the group establishes communication between the control valves and the source of fluid thus completing the hereinafter described hydraulic circuit.

Figure 7:
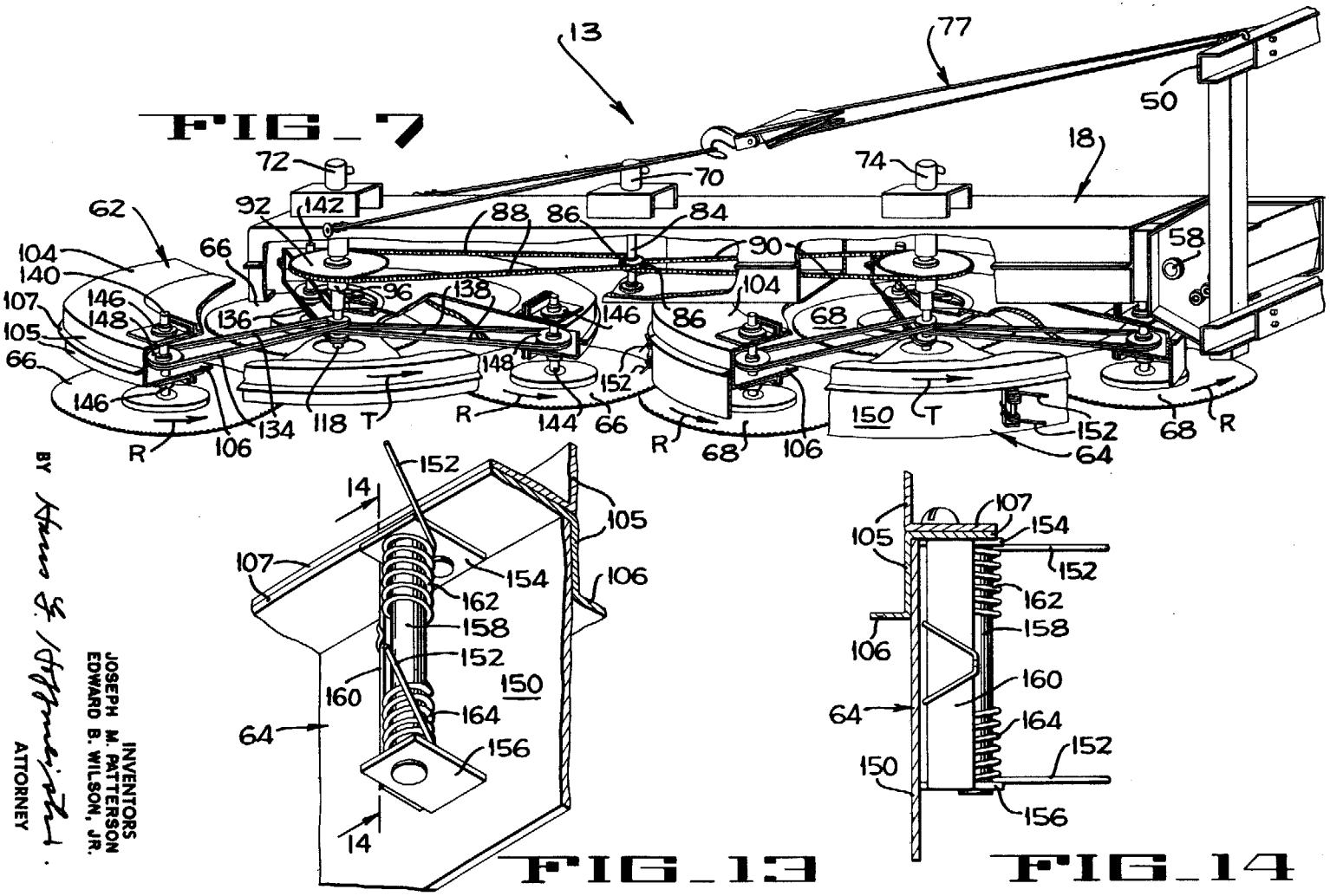
FIGURE 7 is an enlarged perspective, partly broken away, of the cutting elements and the associated boom.
Figure 8:
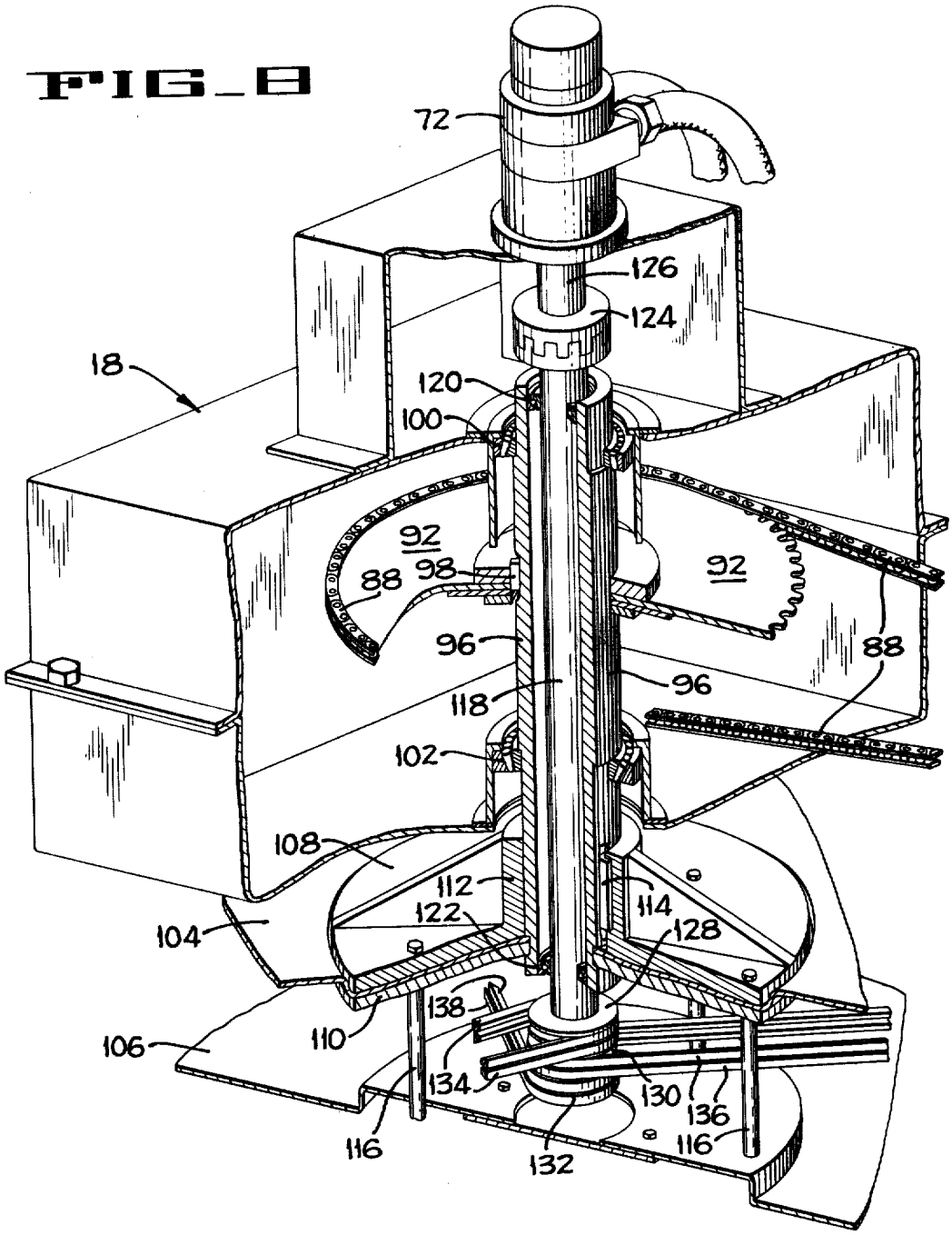
FIGURE 8 is an enlarged perspective, partly broken away, showing the construction of the drive for the outboard cutting elements.

The drive for the saw carriers 62 and 64 and for the individual saws 66 and 68 is shown in FIGURES 7 and 8. The rectangularly shaped elongated boom 18 has a hollow interior, and a shaft 84 (FIG. 7), which is coupled to the drive shaft of motor 70, is rotatably journalled in the upper and lower walls of the boom. A pair of sprockets 86 are keyed to the shaft 84 and have trained about a portion of their peripheries sprocket chains 88 and 90 which respectively drive the carrier 62 and the carrier 64. Since the construction of the drives for the carriers are identical, only the drive for the outboard carrier 62, shown in enlarged detail in FIGURE 8 will be described, it being understood that the description thereof will also apply to the carrier 64. A sprocket 92 is secured to a tubular shaft 96 by means of a conventional key 98 so that the torque imparted to the sprocket 92 is in turn transmitted to the shaft 96. Bearings 100 and 102, supported by the upper and lower walls of the boom 18, respectively, rotatably support the tubular shaft 96 to extend transversely through opposite walls of the boom 18. Each saw carrier includes upper and lower circular plates 104 and 106, respectively. At its periphery, each plate has a skirt portion 105 (FIG. 7) that terminates in a flange 107. With the flanges 107 positioned in aligned and abutting engagement, the upper and lower plates are secured together by means of bolts extending through the flanges. The central portion of each upper plate 104 is received between flanges 108 and 110 (FIG. 8) with the upper flange 108 having an integral hub 112 secured by a key 114 to the shaft 96. The central portion of each lower plate 106 is supported from the flanges 108 and 110 by elongated bolts 116 is shown in FIGURE 8. In this manner, rotation imparted to the sprocket 92 by the chain 88 is transmitted to the flanges 108 and 110 which, in turn, cause rotation of the carrier 62. An elongated shaft 118 is rotatably mounted concentrically within the tubular shaft 96 by bearings 120 and 122. The shaft 118 is secured at its upper end by a coupling 124 to the output shaft 126 of the motor 72. The lower end of the shaft 118 has longitudinally adjacent V-belt pulleys 128, 130 and 132 secured thereon for rotation therewith. Each of the pulleys has a pair of grooves for receiving pairs of V-belts 134, 136 and 138 cooperable with the pulleys 128, 130 and 132, respectively.

As shown in FIGURE 7, the saws 66 are secured to arbor shafts 140, 142 and 144 which are radially and equiangularly circumferentially spaced relative to the shaft 118. Each of the shafts is rotatably secured to the carrier 62 by upper and lower aligned bearings 146 that are secured to the upper and lower plates 104 and 106. At an intermediate portion of each of the shafts 140, 142 and 144, and between the plates 104 and 106, a V-belt pulley 148 is keyed to the shaft. The pairs of V-belts 134, 136 and 138 are connected in driving relation respectively to the pulleys 148 to thereby transmit the torque imparted to the shaft 118 by the hydraulic motor 72 to each of the saw arbor shafts 140, 142 and 144.

Thus, according to the above described construction, the saw supporting carriers 62 and 64 are capable of cutting a wide swath when the longitudinal axis of the boom 18 is positioned substantially normal to a row of trees while, at the same time, the boom is capable of being moved to a position generally parallel to the longitudinal centerline of the frame, as shown in FIGURE 1 for "on-highway" transportation, the lateral width of the carriers in said parallel position being within the prescribed legal limits for vehicles travelling on the highway. Moreover, the two rotary saw carriers 62 and 64, due to their direction of rotation and their shape, cooperate to convey the branches and brush from the tops of the trees toward the space between adjacent rows of trees, said space being known as the row middles. By reducing the diameter of the orbit for the individual saws and by providing dual saw carriers, a corresponding reduction in the mass and the torque inertia force is effected. It is to be noted that the orbit defined by the saws 66 on carrier 62 extends in overlapping relation with the orbit defined by saws 68 on the inboard carrier 64, accordingly, the brush or branches which are within the projected area between the inboard and outboard carriers 62 and 64, respectively, are engaged by one or more of the saws 66 and 68 and thus removed.

In one successful installation, each saw was approximately 36" in diameter and its axis of rotation was about 28" from the axis of rotation of the associated carrier. Each carrier was about 6 feet in diameter, and the distance between the centers of the two carriers was approximately 7 feet.

The inboard saw carrier 64 and the portion of the boom 18 intermediate the carriers are provided with resilient brush engaging fingers which are cooperatively associated to assist in conveying or forcing the severed branches and brush from the tree tops toward the row middles. Extending downwardly from the flange 105, a circumferentially continuous skirt 150 is secured to the carrier 64 and is provided with generally radially extending resiliently supported fingers 152 secured to the outer surface thereof in circumferentially spaced relation. In FIGURE 13, an enlarged perspective is shown of a portion of the carrier 64 and a corresponding portion of the skirt 150 associated therewith on which the resiliently supported spring fingers 152 are mounted. Laterally spaced upper and lower brackets 154 and 156, respectively, are rigidly secured in any desired manner to the skirt 150. Aligned bores in the brackets have rigidly secured therein a rod 158. A binding post 160 has the opposite ends thereof rigidly secured to respective side marginal portions of the brackets 154 and 156 to extend transversely therebetween. Upper and lower coils 162 and 164 embrace the rod 158 in longitudinally spaced relation and have respective terminal portions bent about the binding post 160 and joined together as shown best in FIGURE 14. The free terminal portions of the spring coils 162 and 164 extend tangentially relative to the coils to define the generally radially extending resiliently supported fingers 152. With this arrangement the branches and brush cut by the saws is engaged by the fingers 152 as the carrier 64 rotates, sweeping the branches and brush in the direction of the arrow T (FIG. 7) from the tree tops. It is to be appreciated that in the event the quantity, size, or both, of the branches and brush offers too much resistance to the fingers 152, the fingers bend backwardly, causing the coils to wind tighter on the rod 158. This yieldable mounting of the fingers is effective to avoid permanent deformation thereof. As shown in FIG. 2, additional resiliently supported finger means 166, similar to those just described, are mounted on the lower surface of the boom 18 between the carriers 62 and 64 and are effective to accumulate brush or branches for removal by the resiliently supported fingers 152 on the carrier 64.

Figures 9, 10:
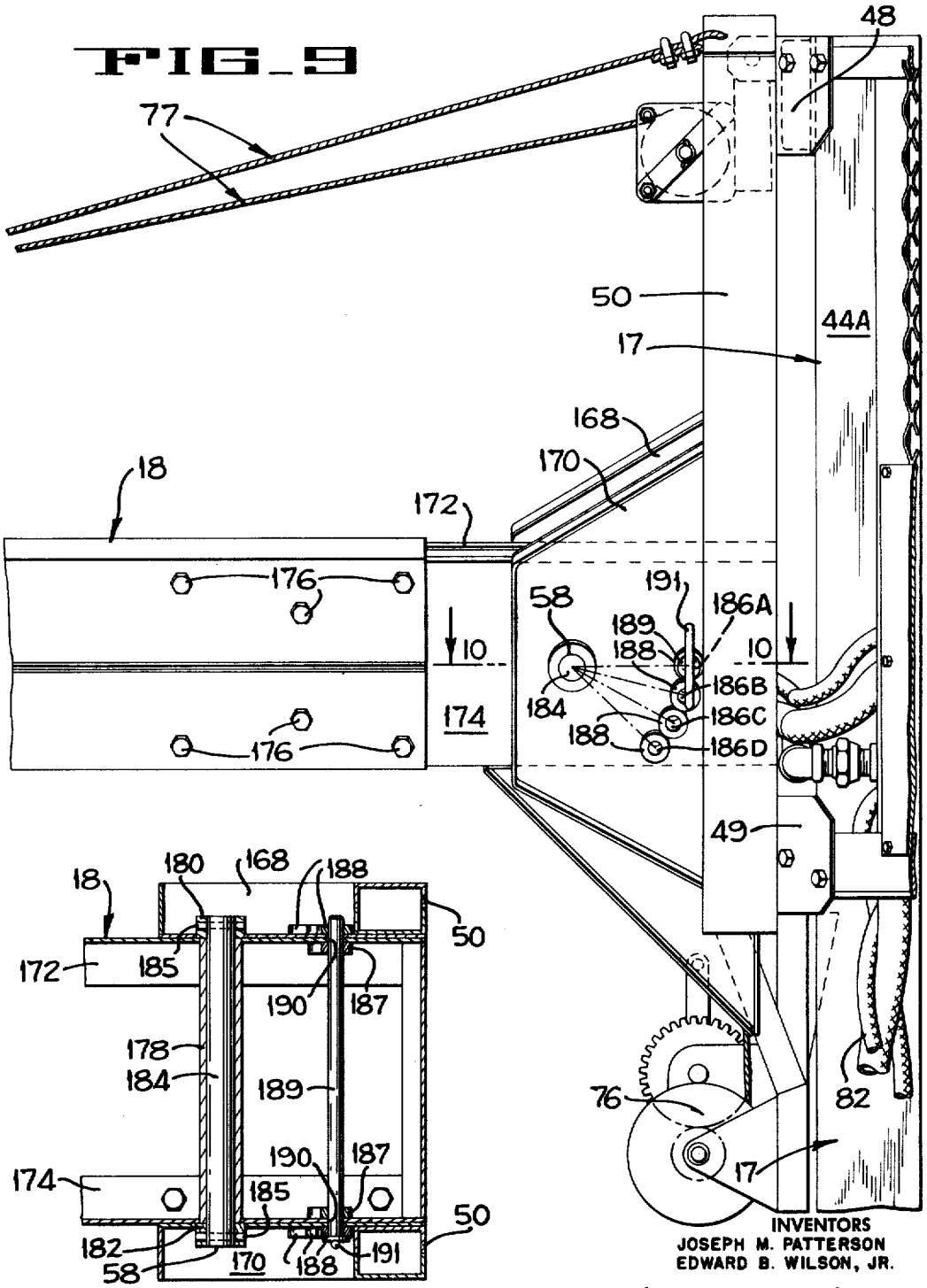
FIGURE 9 is an enlarged fragmentary elevation showing the upper portion of the telescoping support and the inboard portion of the boom connected thereto.
FIGURE 10 is a section taken along line 10—10 of FIGURE 9.

Referring now to FIGURES 9 and 10, the manner in which the boom 18 is pivotally supported on the intermediate frame 50 is illustrated. Rigidly secured in laterally spaced and aligned relation to the intermediate frame 50 are bracket members 168 and 170 between which the inboard end portion of the boom 18 is received. The inboard portion of the boom 18 includes spaced channel members 172 and 174 rigidly secured to the adjacent portion of the boom preferably by bolts 176. The pivotal connection 58 includes a tubular member 178 (FIG. 10) extending transversely between the channel members 172 and 174 and having the opposite ends thereof rigidly secured to the channel members. Tubular bosses 180 and 182 are rigidly secured to the brackets 168 and 170 respectively and are located in concentric relation with the tubular member 178 to thereby define a continuous bore of uniform diameter. A pin 184, which is at least longitudinally coextensive with the bore, is held in the bore by pins 185. With the axis of pin 184 as a center, a plurality of equidistant circumferentially spaced holes 186A–186D (FIG. 9) are formed in bracket 170 in an arcuate pattern, each hole being aligned with a corresponding hole in the bracket 168, as shown in FIGURES 9 and 10. A hub 188 is secured to the brackets 168 and 170 around each hole 186A–186D. A pair of transversely aligned holes 190 (FIG. 10), positioned the same radial distance from the center of the rod 184 as holes 186A–186D, and having bosses 187 associated therewith, are formed in each of the channel members 172 and 174 for receiving a pin 189 which is of sufficient length to extend through the holes 186A–186D as shown in FIGURE 10. It is preferred that the pin 189 is selectively manually removable and to this end a diametrically extending handle 191 (FIG. 9) is secured to one end thereof to provide a handle which can be easily grasped by the operator to remove the pin 189 from the associated holes. Accordingly, during the times when it is desired to effect angle topping of the tree the operator tensions the cable system 77 by the winch 76 to remove the shearing forces imposed on the pin 189 and then slides the pin out of the holes. Further actuation of the winch 76 to wind the cable on the drum effects pivotal movement of the boom 18 in a clockwise direction, as viewed in FIG. 9, and successively brings the holes 190 into alignment with the pairs of aligned holes in the brackets. When the desired angular position of the boom is reached, the pin 189 is inserted to thus hold the boom in that position.

It is to be noted that the holes 186A–186D are disposed on radial lines from pin 184 that are at 15° intervals. Accordingly, angular boom positions at 15°, 30° and 45° relative to the horizontal can be obtained when the holes 190 in the boom are selectively aligned with the holes 186B, 186C and 186D respectively. To obtain settings of 7½° and 22½°, a second pair of holes (not shown) are provided in the boom. These second holes are on radial lines that are 22½° clockwise (FIG. 9) from the radial lines passing through the holes 190. When these second holes are aligned with holes 186C, a 7½° setting is obtained, and when they are aligned with holes 186D, a 22½° setting is obtained.

Figure 11:
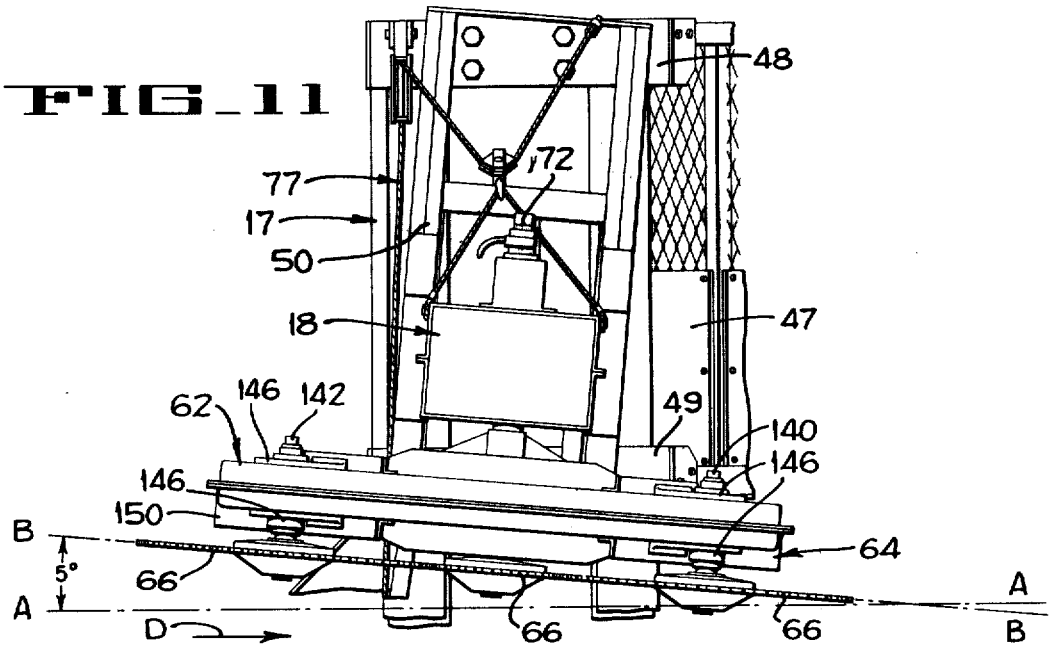
FIGURE 11 is an end elevation of the boom illustrating the acute angle relative to the horizontal at which the cutting elements are disposed.

In order to facilitate and assist in moving severed branches and brush from the tree tops toward the row middles and to reduce the resistance to saw rotation, the intermediate frame 50, which supports the brackets 168 and 170 and the boom 18, is secured to the upper mast members 44, 44A at an acute angle relative to the vertical so that the planes in which the saws 66 and 68 orbit define an acute angle with the horizontal as shown in FIG. 11. During operation, the tree topping machine is moved in the direction indicated by the arrow D. The line A—A represents a horizontal plane and the line B—B represents the orbital plane of the saws 66. The angle defined by the intersection of the planes A—A and B—B is relatively small, for example 5°, as indicated in FIG. 11. The portion of the orbit of the saws 66 intersecting the horizontal plane A—A defines, for purposes of description, the leading edge of the orbit with the diametrically rearwardly opposed portion defining the trailing edge. By so orienting the boom 18 and the saw carriers 62 and 64, each of the saws 66 and 68, as they are being curvilinearly translated about the centers of the carriers 62 and 64, and as they rotate about their individual shafts, establish cutting engagement with the branches and the brush during the leading edge of the orbit and are free of the branches and the brush at the trailing end of their orbit. Accordingly the angle of attack of the saws relative to the tree tops imparts an upwardly directed movement to the severed branches and brush which, in conjunction with the direction of carrier rotation, assists in moving the severed branches and brush toward the row middles. Another benefit derived from the above described orientation of the saws is that the input power requirements for the saw motors 72 and 74 and for the carrier motor 70 is less than would normally be required since the saws, at the trailing end of their orbit, are displaced from the line of cut, thereby being able to freely rotate.

Figure 12:
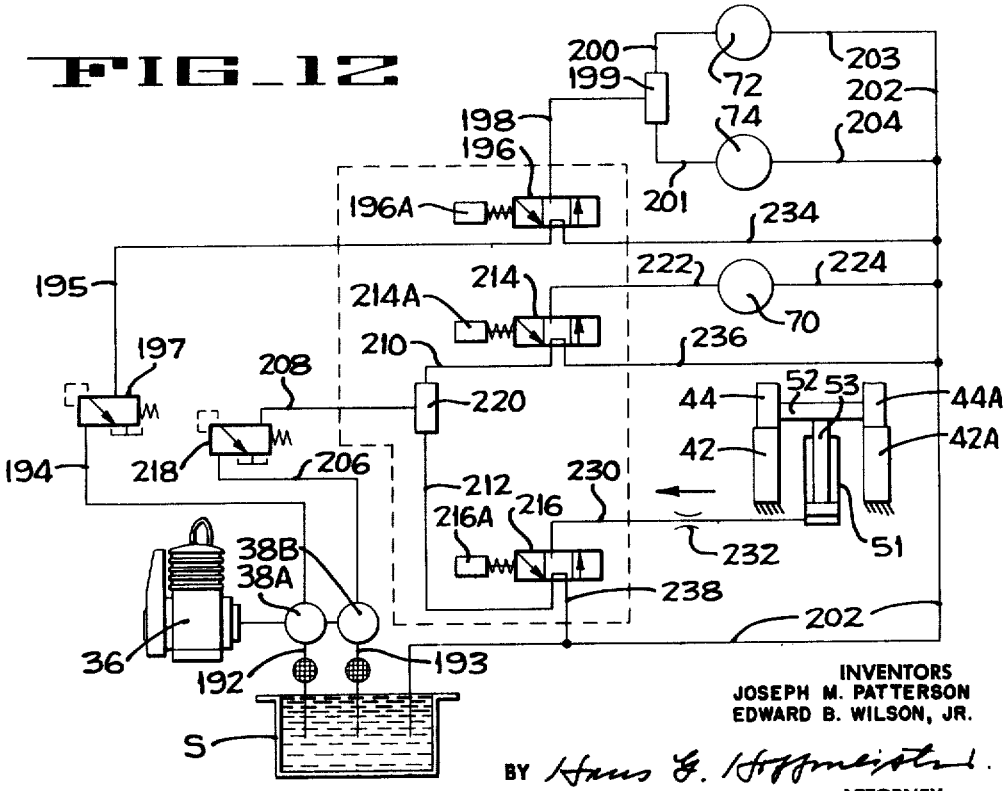
FIGURE 12 is a schematic diagram of the hydraulic system employed with the machine of the present invention.

In FIGURE 12 is shown the schematic fluid circuit employed for telescoping the members of the mast 17 and for actuating the hydraulic motors 70, 72 and 74. As previously mentioned, the output shaft of the prime mover 36 is connected to drive the tandem pump 38 which is indicated in FIG. 12 as two pumping units 38A and 38B having suction lines 192 and 193 respectively in communication with a source of fluid contained within the sump S provided by the turntable 16. The fluid pressurized by the pump 38A communicates by means of conduits 194 and 195 with a conventional three-way valve 196 having an actuating knob 196A. A conventional pilot operated relief valve 197 has the inlet thereof connected to the conduit 194 and the outlet connected to the conduit 195 and is adjusted to establish a predetermined pressure of the fluid in the conduits 194 and 195. A conduit 198 connects the outlet of the three-way valve 196 to a flow divider 199, which is operable to equalize the quantity of fluid delivered to the motors 72 and 74. Conduits 200 and 201 are connected to the flow divider 199 and to the inlet of the motors 72 and 74, respectively. A common return conduit 202 is connected to the discharge of the motors 72 and 74 by conduits 203 and 204, respectively, and in this manner the pressure fluid delivered to the motors by the conduits 200 and 201 is returned to the sump S by the conduits 203, 204 and 202. Conduit 206 connected to the discharge of pump 38B, and the conduits 208, 210 and 212 establish communication to similar three-way valves 214 and 216 with conduit 210 being connected to valve 214 and conduit 212 being connected to valve 216. A relief valve 218, similar in construction and function to valve 197, has its inlet connection to conduit 206 and its outlet to conduit 208 and is adjusted to establish a predetermined pressure of the fluid in conduits 206, 208, 210 and 212. The conduit 208 is connected to a flow divider 220, which is similar to the flow divider 199, and is effective to distribute, in accordance with predetermined values, the quantity of pressurized fluid to the valves 214 and 216. The outlet of valve 214 is connected to the saw carrier motor 70 by conduit 222 and the discharge of the motor is connected to conduit 202 by conduit 224 so that return of the fluid to the sump S is effected. The single acting hydraulic cylinder 51 is of conventional construction and, as previously mentioned, has the projecting end of the rod 53 cooperably connected to the upper members 44, 44A of the mast, to effect telescoping slidable movement of the members 44, 44A and 43, 43A relative to members 42, 42A which are fixed to the base frame of the machine. A conduit 230, having a variable restrictor valve 232, establishes communication between the lower end of the cylinder 51 and the valve 216. The illustrated center position of the valves 196, 214 and 216 connects the conduits 195, 210 and 212, respectively, to conduits 234, 236 and 238.

Figure 6:
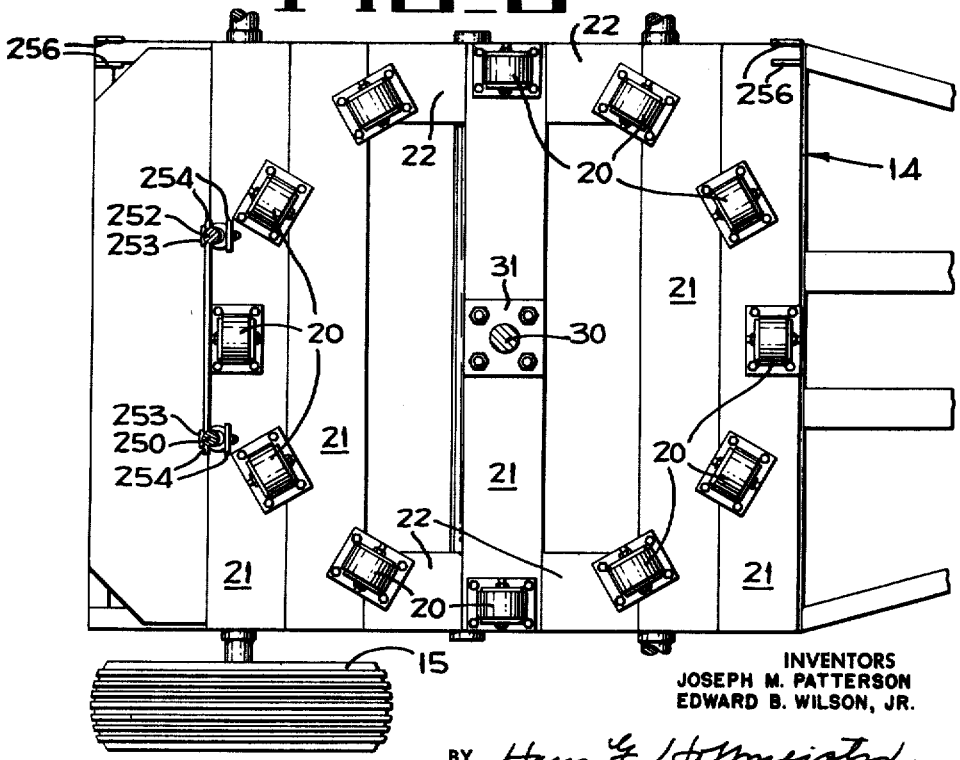
FIGURE 6 is a section taken substantially along the line 6—6 of FIGURE 5.

The turntable 16 has two principle operating positions; one, in which the boom 18 is in a straight-ahead position extending generally parallel to the longitudinal centerline of the vehicle and the other in which the boom is in a transverse position projecting substantially at right angles to said vehicle centerline. When the boom is in the straight ahead position, two turnbuckles 250 and 252 (FIGS. 5 and 6) are connected by clevis pins 253 between apertured members 254 on the base 14 and apertured members 255 on the support member 35 which is welded to the turntable. When the boom is moved to its transverse position, the turnbuckles are disconnected from the members 254 of the base and are connected to other apertured members 256 (FIG. 6) of the base when the boom reaches the transverse position. These turnbuckles prevent unauthorized rotation of the turntable and act as hold down members.

One manner in which the preferred embodiment of the invention may be operated is as follows: when the machine shown in FIGURE 1 has been brought "on sight," that is, when it has been positioned adjacent a row of trees, the hitch 19 is connected to a cooperating hitch on a prime mover (not shown). A storage leg N on the forward portion of the base frame 14 and boom supporting rod M are removed. The engine 36 is started and in turn the pumps 38A and 38B are operated to pressurize the hydraulic circuit. The operator takes his position in the cab 47 within which the hydraulic control valve 196, 214 and 216 are located. Telescoping movement vertically upwardly of the members of the mast is effected by manually actuating knob 216A to shift the spool of the valve 216 to the left, as viewed in FIGURE 12, to establish communication between the conduit 212 and 230 to thus pressurize the lower end of the cylinder 51. Pressure fluid is conducted from the pump 38B to the cylinder 51 by conduits 206, 208, 212 and 230. When the boom 18 has been raised to the desired height, the operator manually shifts the spool of the valve 216 to its neutral position (the illustrated position) disconnecting conduits 212 and 230, and blocking the pressure fluid in cylinder 51 and conduit 230. Accordingly, the pressure fluid flowing through conduit 212 is shunted through the valve 216 and returned to the sump S by conduits 238 and 202. Trapping the fluid in the cylinder 51 holds the upper members of the mast in a fixed position relative to the lower members 42, 42A and thus the boom is maintained in a fixed position vertically upwardly from the base frame 14. The hold-down turnbuckles 250 and 252 are released and the turntable is rotated relative to the base frame 14 causing curvilinear translation of the superstructure of the machine so that the boom 18 extends over the row of trees. The turnbuckles are then reconnected to maintain the position of the boom over the trees.

To operate the saw motors 72 and 74, the operator manually engages knob 196A and shifts the valve 196 to the left, as viewed in FIGURE 12, establishing communication between conduit 195 and conduit 198 so that pressure fluid discharged by pump 38A to conduit 194 is communicated to the flow divider 199 which receives the pressure fluid from the conduit 198. The flow divider 199 distributes equal quantities of pressure fluid to the motors 72 and 74 by means of the conduits 200 and 201, respectively, consequently causing rotation of the shafts of motors 72 and 74. The fluid is discharged by the motors 72 and 74 through conduits 203 and 204, respectively, which are in turn connected to the return 202 for returning the fluid to the sump S. The saws 66 and 68 on the outboard and inboard rotors 62 and 64, respectively, are now rotating. Rotation of the carriers 62 and 64 is initiated by manually engaging knob 214A and shifting the spool of valve 214 to the left, as viewed in FIGURE 12, to establish communication between the conduit 210 and the conduit 222 whereby fluid discharged by the pump 38B into the conduit 206 passes through the valve 218 and the conduit 208 and is directed to the conduit 210 through the flow divider 220. The pressurized fluid in line 222 effects rotation of the motor 70 and consequent rotation of the carriers 62 and 64. The fluid from the motor 70 is discharged into line 224 which is connected to the return line 202 returning the hydraulic fluid to the sump S.

It will be noted by inspection of FIGURE 7, that the orbital path of the saws 66 and 68 overlap to thereby make a slightly stepped continuous line of cut, extending from the inboard margin of the orbit of the saws 68 to the outboard margin of the orbit of the saws 66. Assuming that the boom 18 is adjusted about the pivotal connection 58 to form a flat cut on the tops of the trees, the prime mover (not shown) to which the tree topping machine 13 is connected is started and the vehicle is moved along the row of trees. The saws 66 and 68 are thereby brought into engagement with the tree tops to effect cutting of the branches and brush. When the carrier 62 and 64 are rotated in the direction of the arrows T and the machine is transported in the direction of the arrow D of FIGURE 11, the branches and brush cut by the outboard rotor 62 are urged inwardly toward the inboard rotor 64 whereby the resiliently supported fingers 152 continually engage the brush and move it toward the row middles of the trees. The branches and brush which tend to pass into the passageway defined by the carriers 62 and 64 and the boom 18 are engaged by the pairs of fingers 166 (FIG. 2) extending laterally downwardly from the lower surface of the boom 18 and thus the fingers hold the branches and brush at that position so that they may be picked up or engaged by the fingers 152 on the inboard carrier 64 to thereby cause movement of the branches and brush toward the row middles.

When it is desired to top the trees at an angle, the boom 18 is pivoted upwardly about the pivotal connection 58. To accomplish pivotal movement of the boom 18 the operator tensions the cable system 77 by means of the winch 76 to release the forces on the pin 189. With the forces released, the operator grasps the handle 191 and withdraws the pin 189 from the pair of holes 186A, 186B, 186C or 186D in which it is disposed. After the pin is withdrawn, the operator winds the cable 77 onto the winch 76 causing pivotal movement of the boom 18 about the pivotal connection 58, such movement being continued until the desired angular relation of the boom with respect to the horizontal is achieved. This adjusting movement of the boom brings one of the two holes in the channel members 172 and 174 into alignment with one pair of the pairs of holes 186A–D in the brackets 168, 170, and the pin 189 is then re-inserted to hold the boom in its desired angular position. Assuming the mast is to be lowered, the operator shifts the spool of the valve 216 (FIG. 12) to the right connecting conduit 230 with the conduit 238. The mass of the superstructure is acting downwardly on the fluid trapped within the cylinder 51 and it forces the hydraulic fluid through the conduit 230, the valve 216, and the conduit 238 to the return line 202. It will be noted that the conduit 230 includes a restrictor valve 232 which is operable to control the speed at which the upper members of the mast are moved downwardly. When the correct height of the boom, has been achieved the operator returns the valve 216 to its neutral position, the position shown in FIGURE 12 and again the fluid is trapped in the conduit 230 and the cylinder 51. Once the adjustments are made, the prime mover is again moved forwardly pulling the topping apparatus along the rows of trees.

When a tree topping operation is completed, the machine is rendered inoperative by manually shifting the spools of the valves 196 and 214 to the right to the neutral position. Shifting the spool of the valve 196 to the neutral position, which is the position shown in FIG. 12, results in the pressure fluid in conduit 195 being shunted through the valve 196 and returned to the sump through the conduits 234 and 202. In this position the motors 72 and 74 are stopped and the pressure fluid in the conduits 198, 200 and 201 is trapped. If draining of the lines is desired the spool of the valve is moved further to the right, establishing communication between the conduit 198 and the conduit 234 through a cross-passage in the valve, permitting the flow of the trapped fluid back to the sump through the conduit 234 and 202. In a similar manner, the spool of the valve 214, when shifted to the illustrated neutral position interrupts rotation of the motor 70 and the pressure fluid from the pump 38B in the conduit 210 is shunted through the valve 214 and the conduit 236 and is returned to the sump through the conduit 202.

Accordingly the structure of this invention provides a tree topping machine having shrouded saw carriers 62 and 64 that not only preclude interference of the branches and brush with the operation of the saws but also function to cause migration or movement of the cut branches and brush toward the row centers of the trees. The resiliently supported fingers 152 on the skirt of the inboard carrier 64 and the fingers 166 on the lower surface of the boom 18 provide positive branch and brush engaging means which also assist in moving the cut branches and brush toward the row centers of the trees. The ability of the apparatus to top the trees at angles of 7½°, 15°, 22½°, 30°, and 45°, will permit flat topping of the trees on slopes, hillsides, or in citrus orchards where the machine may not be able to travel on level terrain. In addition, this feature is of particular value when making large cuts and removing great amounts of wood. The first cuts are made at a steeply inclined angle to remove most of the brush at the outside of the tree and then a cut is made at a lesser angle to remove the growth in the center of the trees.

While a preferred apparatus for carrying out the invention has been shown and described, it will be understood that it is capable of modification and variation while still employing the principles of the invention. [It is also to be understood, therefore, that the scope of the invention should be limited only by the scope and proper interpretation of the claims appended hereto.]

Having thus described the invention, that which is believed to be new and for which protection by Letters Patent is desired is:

[1. A tree topping apparatus comprising a fixed mobile base, a telescoping vertically extending support on said base, an elongated boom having one end thereof pivotally connected to said support for pivoting in a vertical plane with respect to said fixed support, a plurality of saw carriers rotatably supported on said boom, and a plurality of rotatable saws on each of said carriers.]

2. A tree topping apparatus comprising a mobile base, a telescoping vertically extending support on said base, an elongated boom having one end thereof pivotally connected to said support for pivoting in a vertical plane with respect to said support, a plurality of saw carriers rotatably supported on said boom, a plurality of rotatable saws on each of said carriers, and brush engaging fingers on at least one of said carriers for sweeping the cutting produced by said saws in a predetermined direction.

[3. An elongated boom for rotatably supporting tree topping means comprising longitudinally spaced saw carriers rotatably supported on said boom, a plurality of circumferentially spaced rotatable saws on each of said carrier means, and power means on said boom for rotating said carriers relative to said boom and for rotating said saws relative to said carriers, said saws on one of said carriers defining an overlapping orbit with the saws of the other of said carriers whereby a generally uninterrupted line of cut is produced by said saws.]

4. A tree topping apparatus comprising a vertically adjustable support, an elongated boom having one end pivotally secured to and extentding transeversely to said support, inboard and outboard rotatable saw carriers on said boom, a plurality of rotatable saws on each of said carriers for cutting branches and brush from the tops of trees, a plurality of branch and brush engaging fingers on said inboard carrier for moving the resulting branches and brush toward said vertically adjustable support, and a plurality of branch and brush engaging fingers mounted on said boom and located between said carriers for holding the branches and brush in the projected area between said carriers so that the first mentioned branch and brush engaging fingers are effective to remove such branches and brush and urge it toward said vertical support.

5. A mobile tree topping apparatus comprising an elongated boom having spaces simultaneously rotatable saw carriers thereon, a group of coplanar circumferentially spaced rotatable saws on each carrier with the saws of one group being located in a plane closely adjacent and parallel to the plane of an adjacent group and being movable in an orbit that overlaps the orbit of the saws of the adjacent group, the orbital planes of said saws being positioned at an acute angle relative to the horizontal with the apex of said angle defining the forwardmost orbital portion in the cutting direction of said saws.

6. A tree topping apparatus comprising a mobile base, a telescoping vertically extending support on said base, an elongated boom having one end thereof pivotally connected to said support for pivotal motion in an approximately vertical plane, inboard and outboard shrouded saw carriers rotatably supported on said boom, and a plurality of coplanar rotatable saws on each of said carriers, the saws on said inboard carrier being located in a plane closely adjacent and parallel to the plane of the saws of said outboard carrier, the orbit of the saws of the inboard carrier overlapping the orbit of the saws of the outboard carrier.

7. A tree topping apparatus comprising a mobile base, a telescoping vertically extending support on said base, an elongated boom having one end thereof pivotally connected to said support, shrouded saw carriers rotatably supported on said boom, a plurality of coplanar circumferentially spaced rotatable saws on each of said carriers, the saws on each carrier being located in a plane paralell to the plane of the saws of the adjacent carrier, and means for positioning the planes of said saws at an acute angle relative to the horizontal with the apex of said angle defining the forwardmost cutting position in the cutting direction of said saws.

8. A mobile tree topping apparatus comprising an elongated boom having spaced simultaneously rotatable saw carriers thereon, groups of circumferentially spaced rotatable saws on each carrier with said groups being located in closely adjacent parallel planes, means for positioning the plane of said saws at an acute angle relative to the horizontal with the apex of said angle defining the forwardmost cutting position in the cutting direction of said saws, and brush-engaging fingers on at least one of said carriers for sweeping the cuttings produced by said saws in a predetermined direction.

9. A tree topping apparatus comprising a mobile base, a telescoping vertically extending support on said base, an elongated boom having one end thereof pivotally connected to said support for pivoting in a vertical plane with respect to said support, a plurality of saw carriers rotatably supported on said boom, a plurality of rotatable saws on each of said carriers, and brush engaging fingers on at least one of said carriers for sweeping the cuttings produced by said saws in a predetermined direction, said fingers extending generally radially of the axis of rotation of the associated carrier and include a resilient connection permitting pivotal movement of said fingers.

10. An elongated boom for rotatably supporting tree topping means comprising longitudinally spaced saw carriers rotatably supported on said boom, a plurality of circumferentially spaced rotatable saws on each of said carriers, power means on said boom for rotating said carriers relative to said boom and for rotating said saws relative to said carriers, said saws on one of said carriers defining an overlapping orbit with the saws of the other of said carriers whereby a generally uninterrupted line of cut is produced by said saws, said power means comprising a hydraulic motor, a turntable, means on said turntable defining a reservoir for hydraulic liquid for said hydraulic motor, and a vertically adjustable support on said turntable having one end of said boom pivotally connected thereto for pivotal motion in a vertical plane.

11. A tree topping apparatus comprising a mobile base adapted to be drawn along a row of trees, a telescoping vertically extending suppport on said base, an elongate boom having one end pivotally connected to said support and positionable in a plurality of angular positions relative to said support, spaced saw carriers rotatably mounted on said boom and arranged for rotation in the same direction, said carriers being spaced sufficient distance apart to provide a space therebetween, a plurality of saws rotatably mounted on each carrier and arranged for rotation in the same direction as said carriers, said saws on one of said carriers defining an orbit with the saws of the other of said carriers which overlap in such space between said carrier and are located in closely spaced parallel planes to thereby produce a generally uninterrupted line of cut, the mentioned direction of rotation of said carriers and said saws permitting the tree branches received in such space to be engaged by a saw on each carrier to thereby prevent bending of such branches as they are being cuit.

*12. A tree topping apparatus comprising a mobile base, a mast secured to and projecting upwardly from said base and including lower and upper portions in telescoping relation, an elongated boom having one end thereof pivotally connected to said upper mast portion below the top thereof for elevational movement therewith and for pivoting in a vertical plane relative to said upper mast portion, a plurality of saws rotatably mounted on said boom for rotation in a generally parallel plane, and actuating means connected between said boom and said upper portion of said mast at a point spaced above the point of pivotal connection of said boom and said upper portion of said mast for pivoting said boom relative to said upper portion to vary the palne of said saws.*

*13. A tree topping apparatus comprising a mobile base, a mast mounted on said base and having a lower fixed portion and an upper movable portion adjustable relative to said fixed portion to vary the elevation of said movable portion, a boom having one end thereof pivotally connected to the movable portion of said mast below the top thereof for varying the angle of said boom relative to said mast, rotatable carrier means mounted for rotation on said boom, a plurality of saws rotatably mounted on said carrier means, said saws being arranged to make a generally planar cut through the upper portion of a tree as said carrier means rotates and said saws move in a circular path with said carrier means and also rotate on their own individual axes, and an actuating means connected between the upper surface of said boom and said upper movable mast portion at a point spaced above the point of pivotal connection of said boom and said upper mast portion for pivoting said boom relative to said movable portion to adjustably change the cutting plane of said saws.*

References Cited

The following references, cited by the Examiner, are of record in the patented file of this patent or the original patent.

UNITED STATES PATENTS

| | | | |
|---|---|---|---|
| 2,194,617 | 3/1940 | Scott | 56—235 |
| 2,579,862 | 12/1951 | Richardson | 143—43.34 |
| 2,624,380 | 1/1953 | Haynes | 143—43.34 |
| 2,698,034 | 12/1954 | Jakku | 143—32.6 |
| 2,777,483 | 1/1957 | Cherem | 143—43.34 |
| 2,926,480 | 3/1960 | Kimball | 56—235 |
| 2,940,486 | 6/1960 | Whitmore | 143—43.34 |
| 3,032,956 | 5/1962 | Mullet | 143—43.34 |
| 3,138,911 | 6/1964 | Pounds | 56—235 |

OTHER REFERENCES

"Pruning Machines for Citrus", Paul W. Moore, vol. 43, No. 2, of The California Citrograph, December 1957.

RUSSELL R. KINSEY, Primary Examiner

P. A. RAZZANO, Assistant Examiner

U.S. Cl. X.R.

143—43